(12) United States Patent
Bhatia et al.

(10) Patent No.: US 8,424,098 B2
(45) Date of Patent: Apr. 16, 2013

(54) SYSTEM AND METHOD FOR ENHANCED DATA SECURITY

(75) Inventors: Mandeep Singh Bhatia, New Delhi (IN); Ramkumar Saptharishi, Bangalore (IN)

(73) Assignee: General Electric Company, Schenectady, NY (US)

( * ) Notice: Subject to any disclaimer, the term of this patent is extended or adjusted under 35 U.S.C. 154(b) by 597 days.

(21) Appl. No.: 12/624,597

(22) Filed: Nov. 24, 2009

(65) Prior Publication Data

US 2011/0126273 A1 May 26, 2011

(30) Foreign Application Priority Data

Dec. 1, 2008 (IN) .......................... 3002/CHE/2008

(51) Int. Cl.
*G06F 21/00* (2006.01)

(52) U.S. Cl.
USPC ................................. 726/26; 726/2; 713/182

(58) Field of Classification Search ................ 726/2–14, 726/16–21, 26–28; 713/182
See application file for complete search history.

(56) References Cited

U.S. PATENT DOCUMENTS

| 7,360,250 | B2 | 4/2008 | Miyagawa et al. | |
| 2003/0208694 | A1* | 11/2003 | Fang | 713/201 |
| 2005/0235044 | A1 | 10/2005 | Tazuma | |
| 2006/0288234 | A1* | 12/2006 | Azar et al. | 713/186 |
| 2007/0118745 | A1* | 5/2007 | Buer | 713/168 |
| 2007/0174456 | A1* | 7/2007 | Yellepeddy | 709/225 |
| 2007/0220594 | A1* | 9/2007 | Tulsyan | 726/5 |
| 2008/0022396 | A1 | 1/2008 | Kado | |
| 2008/0148364 | A1* | 6/2008 | Hopen et al. | 726/4 |

FOREIGN PATENT DOCUMENTS

JP 2000047987 A * 2/2000

OTHER PUBLICATIONS

"Ubiquitous Redirection as Access Control Response", (10 pages), retrieved from the internet URL: http://www.ists.dartmouth.edu/library/156.pdf.

* cited by examiner

*Primary Examiner* — Pramila Parthasarathy
*Assistant Examiner* — Kendall Dolly
(74) *Attorney, Agent, or Firm* — Global Patent Operation

(57) ABSTRACT

A method for protecting data stored in a data repository. The method includes verifying authenticity of a user at each of a plurality of levels. Furthermore, the method includes directing the user to one of a first path or a second path based on the verification of the authenticity of the user at each of the plurality of levels. Systems and computer-readable medium that afford functionality of the type defined by this method are also contemplated.

17 Claims, 6 Drawing Sheets

SYSTEM AND METHOD FOR ENHANCED DATA SECURITY

CROSS-REFERENCE TO RELATED APPLICATIONS

This application claims priority under 35 U.S.C. §119(a)-(d) or (f) to prior-filed, co-pending Indian patent application serial number 3002/CHE/2008, filed on Dec. 1, 2008, which is hereby incorporated by reference in its entirety.

BACKGROUND

1. Field of the Invention

The invention relates generally to methods and apparatus for providing data security, and more particularly to methods and apparatus for a workflow configured to safeguard clinical and other confidential data.

2. Description of Related Art

As will be appreciated, facilities, such as, but not limited to, hospitals, clinics, financial institutions, gather and store huge volumes of sensitive and confidential information. By way of example, hospitals may acquire and store clinical data associated with patients, such as HIV or Hepatitis related data or clinical research findings. Unfortunately, there have been incidents where the data has been hacked by unauthorized users or hackers. This information may then be abused for financial or other forms of gain.

Currently, there exist techniques configured to secure the confidential information. However, these techniques typically provide only a first level of security. In other words, these techniques generally require a user to input a user identification code and a corresponding password and direct the user to the confidential information or data. Also, the currently available techniques typically notify the user of a failed login attempt, thereby prompting/encouraging the user to attempt to relogin into a system to access the confidential information. In addition, there exist techniques that are configured to provide multiple levels of security to the confidential data by requesting the user to input the user identification and password at each of the levels. If there is a match at any of the levels, confidential information corresponding to that level may be displayed to the user.

It may therefore be desirable to develop a robust technique and system configured to aid in protecting confidential and sensitive data that may be stored in a data repository that advantageously facilitates enhanced workflow, while simultaneously preventing unauthorized access to the stored data. In particular, there is a need for a system that is configured to facilitate providing security to the data at a plurality of levels, while maintaining the security of the data at a high level.

BRIEF SUMMARY OF THE INVENTION

In accordance with aspects of the present technique, a method for protecting data stored in a data repository is presented. The method includes verifying authenticity of a user at each of a plurality of levels. Furthermore, the method includes directing the user to one of a first path or a second path based on the verification of the authenticity of the user at each of the plurality of levels. Computer-readable medium that afford functionality of the type defined by this method is also contemplated in conjunction with the present technique.

In accordance with yet another aspect of the present technique, a data security system is presented. The data security system includes a data security platform configured to verify authenticity of a user at each of a plurality of levels, and direct the user to one of a first path or a second path based on the verification of the authenticity of the user at each of the plurality of levels.

In accordance with further aspects of the present technique, a system for protecting data stored in a data repository is presented. The system includes a data acquiring module configured to acquire one or more objects. Furthermore, the system includes a data storage subsystem configured to store the one or more objects, where the data storage subsystem includes a data acquisition subsystem configured to acquire the one or more objects from the data acquiring module and a storage subsystem configured to store the one or more objects. Moreover, the system also includes a data security platform configured to protect the one or more objects by restricting access to the stored one or more objects, where the data security platform is configured to verify authenticity of a user at each of a plurality of levels and direct the user to one of a first path or a second path based on the verification of the authenticity of the user at each of the plurality of levels.

BRIEF DESCRIPTION OF THE SEVERAL VIEWS OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

As will be described in detail hereinafter, a method for protecting data stored in a data repository and a system for protecting data stored in a data repository configured to optimize security of the stored data and simplify workflow in data storage systems, such as data repositories, are presented. Employing the method and system described hereinafter, substantially superior protection of precious data stored in the data repository may be obtained, while preventing unauthorized access to the stored data.

Figure 1:
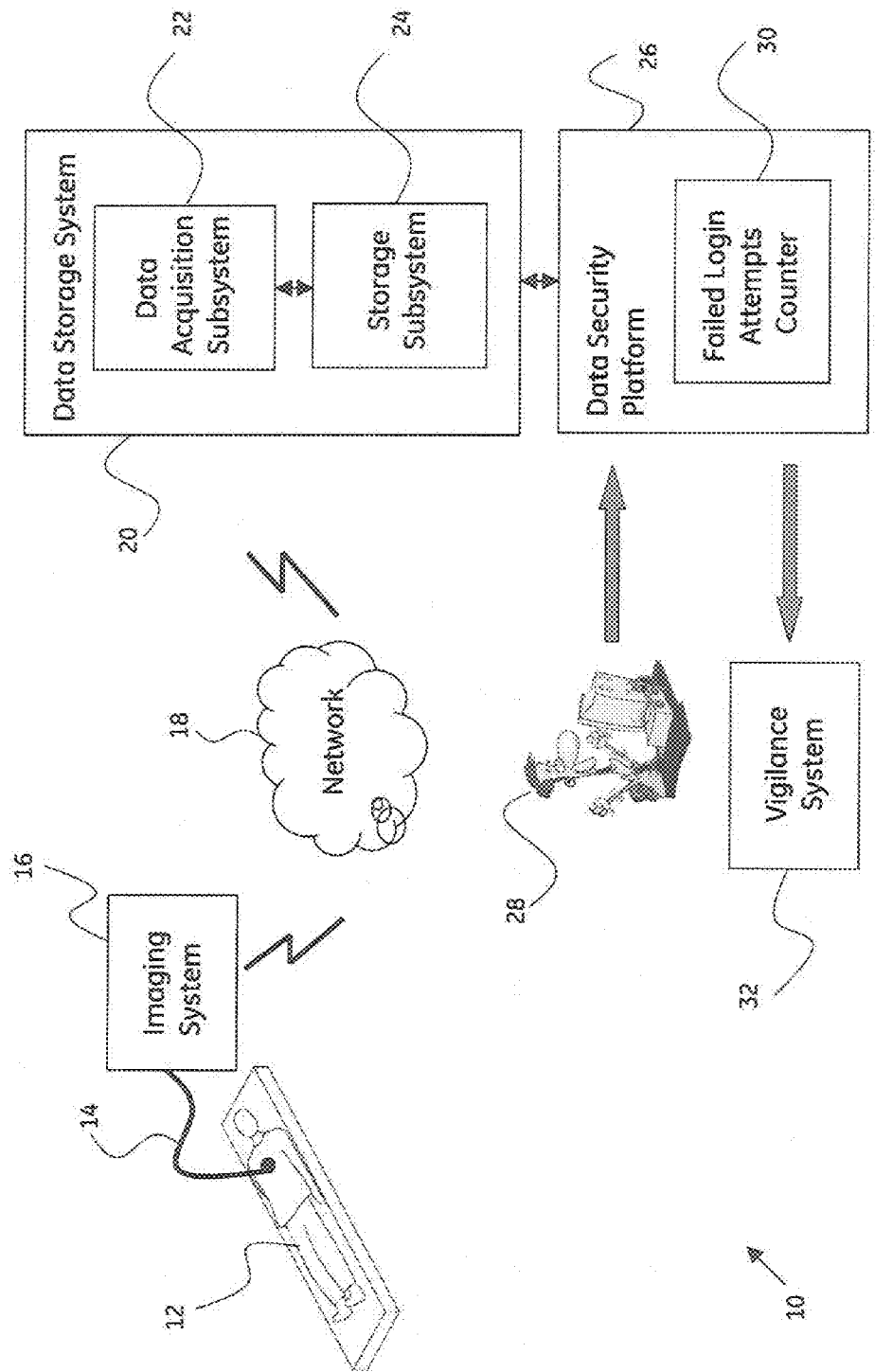
FIG. 1 is a block diagram of an exemplary data security system, in accordance with aspects of the present technique.

FIG. 1 is a block diagram of an exemplary system 10 for use in enhancing security of confidential data stored in a data repository, in accordance with aspects of the present technique. As will be appreciated by one skilled in the art, the figures are for illustrative purposes and are not drawn to scale. The system 10 may be configured to include an imaging system 16, where the imaging system is configured to acquire one or more objects from a patient 12 via an image acquisition device 14. The one or more objects may be representative of image data associated with the patient 12, in the present example. However, in certain other embodiments, these one or more objects may also include images, financial information, clinical research findings, genetic information, maintenance records, service records, log files, or combinations thereof. In one embodiment, the image acquisition device 14 may include a probe, where the probe may include an invasive probe, or a non-invasive or external probe, such as an external ultrasound probe, that is configured to aid in the acquisition of image data. Also, in certain other embodiments, image data may be acquired via one or more sensors (not shown) that may be disposed on the patient 12. By way of example, the sensors may include physiological sensors (not shown in FIG. 1) such as electrocardiogram (ECG) sensors and/or positional sensors such as electromagnetic field sensors or inertial sensors. These sensors may be operationally coupled to a data acquisition device, such as the imaging system 16, via leads (not shown), for example.

Furthermore, in one embodiment, the medical imaging system 16 may be in operative association with the image acquisition device 14. It may be noted that although the exemplary embodiments illustrated hereinafter are described in the context of a medical imaging system, other imaging systems and applications such as industrial imaging systems and non-destructive evaluation and inspection systems, such as pipeline inspection systems, liquid reactor inspection systems, are also contemplated. Additionally, the exemplary embodiments illustrated and described hereinafter may find application in multi-modality imaging systems that employ ultrasound imaging in conjunction with other imaging modalities, position-tracking systems or other sensor systems. Furthermore, it should be noted that although the exemplary embodiments illustrated hereinafter are described in the context of a medical imaging system, such as, but not limited to, an ultrasound imaging system, an optical imaging system, a CT imaging system, a MR imaging system, an X-ray imaging system, or a PET imaging system, other imaging systems, such as, but not limited to, a pipeline inspection system, a liquid reactor inspection system, or other imaging systems are also contemplated in accordance with aspects of the present technique. It may also be noted that the present technique may also find application in a wide variety of electronic systems. For example, use of the present technique in applications, such as, but not limited to, generators and wind turbines are also contemplated.

Figure 2:
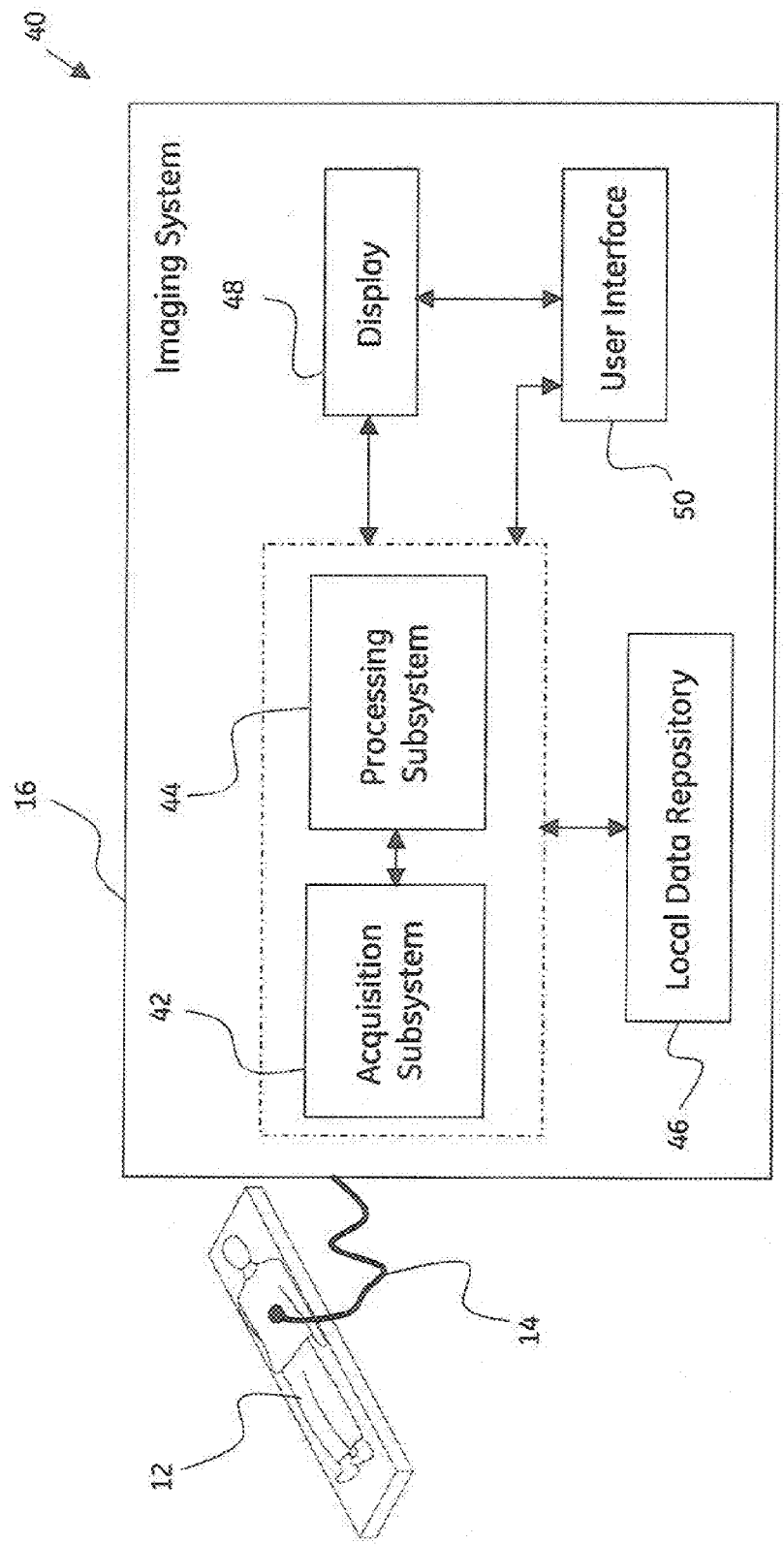
FIG. 2 is a block diagram of an exemplary imaging system for use in the exemplary data security system of FIG. 1.

Referring now to FIG. 2, one embodiment 40 of the medical imaging system 16 of FIG. 1 is illustrated. In a presently contemplated configuration, the medical imaging system 16 may include an acquisition subsystem 42 and a processing subsystem 44. Further, the acquisition subsystem 42 of the medical imaging system 16 may be configured to acquire image data representative of one or more anatomical regions in the patient 12 (see FIG. 1) via the image acquisition device 14 (see FIG. 1). The image data acquired from the patient 12 may then be processed by the processing subsystem 44.

Additionally, the image data acquired and/or processed by the medical imaging system 16 may be employed to aid a clinician in identifying disease states, assessing need for treatment, determining suitable treatment options, and/or monitoring the effect of treatment on the disease states. In certain embodiments, the processing subsystem 44 may be further coupled to a storage system, such as a local data repository 46, where the data repository 46 may be configured to receive and store image data.

Further, as illustrated in FIG. 2, the medical imaging system 16 may also include a display 48 and a user interface 50. However, in certain embodiments, such as in a touch screen, the display 48 and the user interface 50 may overlap. Also, in some embodiments, the display 48 and the user interface 50 may include a common area. In accordance with aspects of the present technique, the display 48 of the medical imaging system 16 may be configured to display an image generated by the medical imaging system 16 based on the image data acquired via the image acquisition device 14.

In addition, the user interface 50 of the medical imaging system 16 may include a human interface device (not shown) configured to aid the clinician in manipulating image data displayed on the display 48. The human interface device may include a mouse-type device, a trackball, a joystick, a stylus, or a touch screen configured to aid the clinician in the identification of the one or more regions of interest requiring treatment, for instance. However, as will be appreciated, other human interface devices, such as, but not limited to, a touch screen, may also be employed. Furthermore, the user interface 50 may also be configured to aid the clinician in navigating through the images acquired by the medical imaging system 16. Additionally, the user interface 50 may also be configured to aid in manipulating and/or organizing the images displayed on the display 48.

As previously noted with reference to FIG. 2, the images may be stored in the local data repository 46. With returning reference to FIG. 1, it may be also be desirable to store the image data acquired via the medical imaging system 16 in a database, for example. Accordingly, the image data acquired and processed by the medical imaging system 16 may be communicated to a first storage 20. In a presently contemplated configuration, the first storage 20 may include a data storage system. Also, in one embodiment, the data storage system 20 may be at a location that is physically remote from the location of the medical imaging system 16. However, as will be appreciated, in certain embodiments, the data storage system 20 may be disposed in substantially close proximity to the medical imaging system 16.

Moreover, in one embodiment, the image data acquired and/or processed by the medical imaging system 16 may be communicated to the data storage system via a network 18. It may be noted that other means of communication, such as, but not limited to, the Internet, the intranet, or wireless communication may also be employed to transmit the image files from the medical imaging system 16 to the data storage system 20. Furthermore, the image data may be transmitted to the data storage system 20 in real-time. Alternatively, the image data may be temporarily stored in a temporary storage, such as the local data repository 46 (see FIG. 2) and communicated to the data storage system 20 at a later time.

Additionally, in one embodiment, the data storage system 20 may include a data acquisition subsystem 22, where the data acquisition subsystem 22 may be configured to receive the image data transmitted from the medical imaging system 16 via the network 18. The image data received by the data acquisition subsystem 22 may be stored in a data repository 24. In the example illustrated in FIG. 1, the data repository 24 may include a storage subsystem. Also, in one embodiment, the storage subsystem 24 may include an archival site, a database, or an optical data storage article. It may be noted that the optical data storage article may be an optical storage medium, such as a compact disc (CD), a digital versatile disc (DVD), multi-layer structures, such as DVD-5 or DVD-9, multi-sided structures, such as DVD-10 or DVD-18, a high definition digital versatile disc (HD-DVD), a Blu-ray disc, a near field optical storage disc, a holographic storage medium, or another like volumetric optical storage medium, such as, for example, two-photon or multi-photon absorption storage format.

In accordance with exemplary aspects of the present technique, the data security system 10 may also include a data security platform 26, where the data security platform 26 may be configured to aid in securing the data stored in the storage subsystem 24. More particularly, the data security platform 26 may be configured to aid in protecting the data stored in the storage subsystem 24 by prevent unauthorized access to the data stored in the storage subsystem 24. In accordance with aspects of the present technique, the data security platform 26 may be configured to verify the authenticity of a user 28 at a plurality of levels. In other words, the data security platform 26 may be configured to allow the user 28 to access the data stored in the storage subsystem 24 only if the data security platform 26 is able to successfully verify the authenticity of the user 28 at each of the plurality of levels. Additionally, the data security platform 26 may also be configured to protect the data stored in the storage subsystem 24 by directing an unauthorized user to a false data set. It may be noted that the terms false data and fake data may be used interchangeably and may be used to refer to a fictitious set of data. Also, instead of using true data sets and fake data sets, the system 10 may be configured to instead use confidential information data sets and non-confidential data sets, in certain embodiments.

As previously noted, the presently available techniques typically notify the user of a failed login attempt, thereby prompting an unauthorized user to reattempt hacking into the data storage to access the confidential information. The shortcomings of the presently available techniques may be overcome by use of the present technique. More particularly, in accordance with exemplary aspects of the present technique, the data security platform 26 may be configured to not notify an unauthorized user of the failure to verify his/her authenticity, thereby preventing the unauthorized user from reattempting to access the data stored in the storage subsystem 24.

In addition, the data security platform 26 may also include a failed login attempts counter 30, where the failed login attempts counter 30 may be configured to track a number of failed login attempts by a user 28. Moreover, the failed login attempts counter 30 may also be configured to compare the number of failed login attempts with a predetermined threshold value. If the number of failed login attempts exceeds the predetermined threshold value, the failed login attempts counter 30 may be configured to notify a vigilance subsystem 32. In accordance with aspects of the present technique, the vigilance subsystem 32 may be configured to notify members of a vigilance team. The working of the data security platform 26 will be explained in greater detail with reference to FIGS. 3-5.

Further, it may be noted that in certain embodiments, communication between the imaging system 16 and the data storage system 20 may be achieved via use of a secure communication channel, while in certain other embodiments, the communication between the imaging system 16 and the data storage system 20 may be achieved via use of a non-secure communication channel. Similarly, the communication between the user 28 and the data storage system 20 via the data security platform 26 may be achieved via use of a secure communication channel, in certain embodiments. Alternatively, in certain other embodiments, the communication between the user 28 and the data storage system 20 via the data security platform 26 may be achieved via use of a non-secure communication channel.

Figure 3:
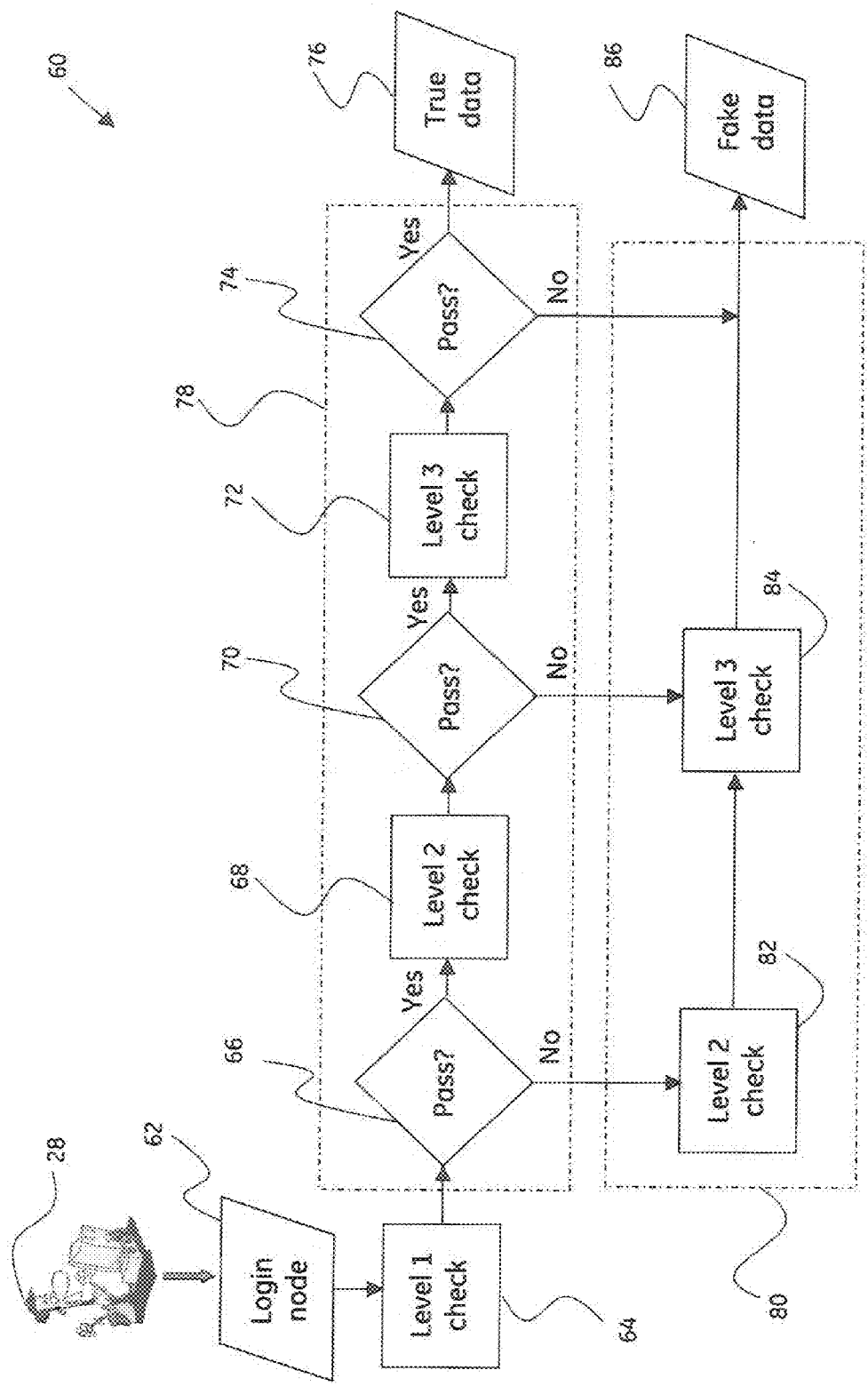
FIG. 3 is a flow chart of an exemplary method for protecting data, in accordance with aspects of the present technique.

In accordance with exemplary aspects of the present technique, a method configured to protect data by preventing unauthorized access to the data stored in a data repository, such as the storage subsystem 24 (see FIG. 1) is presented. The method may be may be better understood with reference to FIG. 3. More particularly, the working of the data security platform 26 (see FIG. 1) may be better understood with reference to FIG. 3. Referring now FIG. 3, a flow chart 60 illustrating the method for protecting data, such as the confidential information stored in a data repository, such as the storage subsystem 24 (see FIG. 1) is depicted. More particularly, one example of a workflow for protecting the data by preventing unauthorized access to the confidential and sensitive data stored in the data repository is depicted in FIG. 3. As previously described, the imaging system 16 (see FIG. 1) may be configured to aid in the acquisition of image data from one or more patients, such as the patient 12 (see FIG. 1). The image data so acquired from the patient 12 may then be stored in a data repository, such as the storage subsystem 24 in the data storage system 20 (see FIG. 1), for example. Also, the data stored in the storage subsystem 24 may include confidential information related to the patient. It may therefore be desirable to restrict access to the confidential information.

Accordingly, the method for preventing unauthorized access to the stored data may be configured to verify authenticity of a user, such as the user 28 (see FIG. 1), at a plurality of levels before allowing the user to access the stored information. In the present example, the data security platform 26 may be employed to verify the authenticity of the user, thereby restricting access to the data to only authentic users. It may be noted that the present example illustrated in FIG. 3 shows three levels of security. However, in accordance with aspects of the present technique, the number of security levels may be varied based on a level of security desired.

Furthermore, in accordance with exemplary aspects of the present technique, the data security platform 26 may be configured to obtain information from the user 28 at a plurality of levels. More particularly, the data security platform 26 may be configured to obtain inputs from the user 28 at the plurality of levels, where the inputs may only be known to an authorized or authentic user, thereby enhancing protection provided to the stored confidential information. It may be noted that in certain embodiments, the plurality of levels may be include a variable number of levels, while in certain embodiments, the number of levels may be fixed. In addition, the inputs requested from the user may include a user identification and password, biometric information, a date of birth, a city of residence, a country of residence, and the like, or combinations thereof.

The method starts at step 64, where the user 28 may attempt to access the data from a data repository, such as the storage subsystem 24. By way of example, the user 28 may attempt to log in to the storage subsystem 24 at a login node 62. As noted hereinabove, the method includes verifying the authenticity of the user 28 at a plurality of levels. Accordingly, the authenticity of the user 28 may be verified at a first level, as indicated by step 64. By way of example, in one embodiment, at step 64, the authenticity of the user 28 may be verified by requesting the user 28 to enter a user identification and a corresponding password. Subsequently, at step 66, a check may be carried out to verify if the user 28 has provided a valid user identification and password. At step 66, if the user identification and the corresponding password are verified by the data security platform 26 as the true user identification and password, then control may be passed on to a second level. In other words, once the user 28 has successfully passed the first level of verification at step 64, the authenticity of the user 28 may also be verified at a second level, as indicated by step 68. In one embodiment, at step 68, the authenticity of the user 28 may be verified via a biometric means. The biometric means may include a fingerprint, a voice match, an eye/retinal scan, or the like. Accordingly, a check may be carried out at step 70 to verify the authenticity of the user 28 at the second level. At step 70, if the authenticity of the user has been verified, then control may be passed on to a third level. In other words, once the user 28 has passed the first and second levels of verification 64, 68, the user 28 may be subject to a third level of verification, as depicted by step 72.

At the third level of verification (step 72), the authenticity of the user 28 may be verified by requesting the user 28 to provide other information. The other information may include a date of birth, a city of residence, a country of residence, a group identification, and the like, or combinations thereof. Accordingly, a check may be carried out at step 74 to verify the authenticity of the user 28 at the third level. At step 74, if the authenticity of the user has been verified, then the user 28 may be allowed to access the data stored in the storage subsystem 24. In other words, the user 28, whose authenticity has been verified at each of the plurality of levels, may be permitted to access a true data set 76 stored in the storage subsystem 24, for example. It may be noted that steps 66-74 may be representative of a "pass path" 78. Following the pass path 78, the user 28 may access the true data set 76. The user that successfully traverses the pass path 78 to access the true data set 76 may generally be referred to as an authentic user or authorized user.

With returning reference to the verification of the first level of authentication at step 66, if the user 28 fails to provide the correct user identification and password, then the user 28 may be directed to a "fail path" 80. As noted hereinabove, the user that fails to provide the valid user identification and password may be referred to as an unauthorized user or a hacker. In accordance with exemplary aspects of the present technique, if the user 28 fails to provide the valid user identification and password at the first security level 64, the data security platform 26 may be configured to direct the user 28 to the fail path 80. In other words, if the user 28 fails to provide a valid user identification and password at the first security level 64, the data security platform 26 may be configured to identify an unauthorized access attempt or security breach. Accordingly, the data security platform 26 may be configured to force the system 10 (see FIG. 1) to guide the user 28 to follow the fail path 80 and subsequently present false data sets to the user 28. In other words, the data security platform 26 may be configured to secure the data stored in the storage subsystem 24 by making it difficult for the unauthorized user that attempts to breach security in order to access the true data set 76. In other words, the system 10, and more particularly, the data security platform 26 may be configured to prevent the unauthorized user from accessing the true data set 76 by presenting a false data set or fake data set 86 to the unauthorized user in response to the incorrect inputs, thereby making it difficult for the unauthorized user to determine a correct input key even with enforced brute force methods. By providing the fake data set 86 to the unauthorized user, the system 10 may be configured to generate a sense of ambiguity to the unauthorized user, as the unauthorized user is unaware of the authenticity of the information obtained.

As will be appreciated, using the currently available techniques, if the user 28 fails to provide valid information at the first level, the user is generally notified about a failed login attempt, thereby allowing the user to reattempt the login at the first level. In accordance with exemplary aspects of the present technique, at step 66, if the user fails to provide the valid user identification and password, the user 28 is not notified regarding the failed login attempt. Instead, the data security platform 26 may be configured to provide a workflow that is substantially similar to that of the pass path 78. In other words, even though the unauthorized user is redirected to the fail path 80, the look and feel of the fail path 80 may be configured to be substantially similar to that of the pass path 78 so as to ensure that the suspicions of the unauthorized user are not raised. More particularly, the apparent difficulty level to access stored data remains equally hard whether the user is on the pass path 78 or the fail path 80. Although the fail path 80 always leads the unauthorized user to fake or false data, in accordance with aspects of the present technique, the fail path 80 may be configured to maintain a feel that is substantially similar to that of the pass path 78 in terms of response time and difficulty level of the information requested from the user to maintain ambiguity of the process. The type of information required at each level may also be varied each time of the process taking into consideration the path used during passing through levels, thereby ensuring additional ambiguity in the process.

In a similar fashion, if the user 28 passes through the verification at step 66 but fails to provide the correct information at the second level 68, the verification at step 70 may be configured to direct the user 28 to the fail path 80. Furthermore, if the user 28 passes through the verification at steps 66 and 70, but fails to provide the correct information at the third level 72, the verification at step 74 may also be configured to direct the user 28 to the fail path 80.

As noted hereinabove, the fail path 80 may be configured to present a workflow that is substantially similar to that of the pass path 78. Accordingly, the steps followed in the fail path 80 may be substantially similar to those of the pass path 78. More particularly, at step 82, in one embodiment, the authenticity of the unauthorized user may be verified via biometric means. In other words, step 82 may be configured to be substantially similar to step 68 of the pass path 78. Further, at step 84, the unauthorized user may be asked to provide other information, such as, but not limited to, a date of birth, a country of residence, a city of residence, a group identification, and the like. In other words, step 84 may be configured to be substantially similar to step 72 of the pass path 78. It may be noted that in the fail path 80 may be configured to bypass verification steps similar to the verification steps 70 and 74 of the pass path 78. In other words, the unauthorized user may be directed to the third level 84, while bypassing a verification of the information input by the unauthorized user at step 82. Once the unauthorized user enters the requested information at step 84, fake data 86 may be presented to the unauthorized user. It may be noted that fake data 86 may be substantially similar to the true data. Also, in one embodiment, the fake data 86 may be created on the fly. Alternatively, the fake data may be generated and stored in a second data repository (not shown in FIG. 1). However, the fake data may also be stored in a portion of the storage subsystem 24, in certain embodiments.

By implementing the method of protecting data as described hereinabove, a dramatically enhanced level of security may be provided to protect confidential and sensitive data stored in data repositories by verifying the authenticity of the user at a plurality of levels. In other words, the true data set 76 may be protected via use of unique keys, where the unique keys may include inputs from the user. Additionally, in accordance with exemplary aspects of the present technique, there exists one unique key, which may be configured to result in a valid workflow, thereby providing an authorized user access to the secure true data set 76. Moreover, since the key is unique, the system 10 may also be configured to identify a user or user group during the login process. In addition, the system 10 may also be configured to use a key that may be a combination of inputs sought from the user at the plurality of levels.

Furthermore, on detecting a breach in security, the system 10 may be configured to guide the unauthorized user through the fail path 80 to the fake data set 86. More particularly, the present technique may be configured to provide fake data to the unauthorized user in response to incorrect or invalid inputs. Further, as the system 10 is configured to not notify the unauthorized user of any failed login attempts, the unauthorized user is unaware of the invalid nature of the fake data 86 presented by the system 10 to the unauthorized user.

The system 10 may also be configured to notify the vigilance team of an unauthorized attempt to access the confidential information, thereby enabling the vigilance team to monitor the activities of the unauthorized user in a timely manner. Additionally, even if the unauthorized user breaches security at one level by identifying one true key, the system 10 is configured to present multiple levels of security checks, thereby enhancing security provided to the stored confidential information. In other words, if the user provides a valid input key at each of the security levels, then the "authorized" user may be allowed to access the true data set 76, while failure of the user to provide a valid input key at any of the security levels leads the "unauthorized user" to the fake data set 86.

In accordance with further aspects of the present technique, even an authorized or authentic user knows that he/she has traversed through a correct path, namely the pass path 78, to access the true data set 76 or through the fail path 80 to the fake data set 86 only after the user obtains information from the data repository, such as the storage subsystem 24, as only the authorized user is aware of information related to certain portions of the accessed true data set 76. In the case of a failed login attempt, the user is directed to the fake data set 86 and only the authentic user may identify as invalid data as the fake data set 86 does not include certain pieces of information that is otherwise present in the true data set 86. In other words, if an authorized user inadvertently provided invalid key inputs, he/she may study the accessed information to investigate the validity/authenticity of the accessed information. Subsequently, the authorized user may notify the vigilance team regarding the error and the vigilance team may be configured to reset the system 10 in order to allow the authorized user to once again access the true data set 76 instead of automatically being directed down the fail path 80 to the fake data set 86.

Also, as described hereinabove, the number of levels is substantially similar for both the pass path 78 and the fail path 80. If the user goes through the fail path 80 more than a predetermined threshold number of times, or obtains the fake data set 86 greater than a predetermined threshold number of times, the vigilance team may be notified to take appropriate action, however, the user is not notified regarding the failed login attempts. This advantageously allows the vigilance team sufficient time to track down the hacker.

In accordance with further aspects of the present technique, the method of protecting data may also include monitoring a number of failed login attempts by an unauthorized user. More particularly, the data security platform 26 (see FIG. 1) may be configured to track the number of failed login attempts. Furthermore, the data security platform 26 may be configured to notify a vigilance team regarding the number of failed login attempts by an unauthorized user. This method of tracking the number of failed login attempts may be better understood with reference to FIG. 4.

Figure 4A:
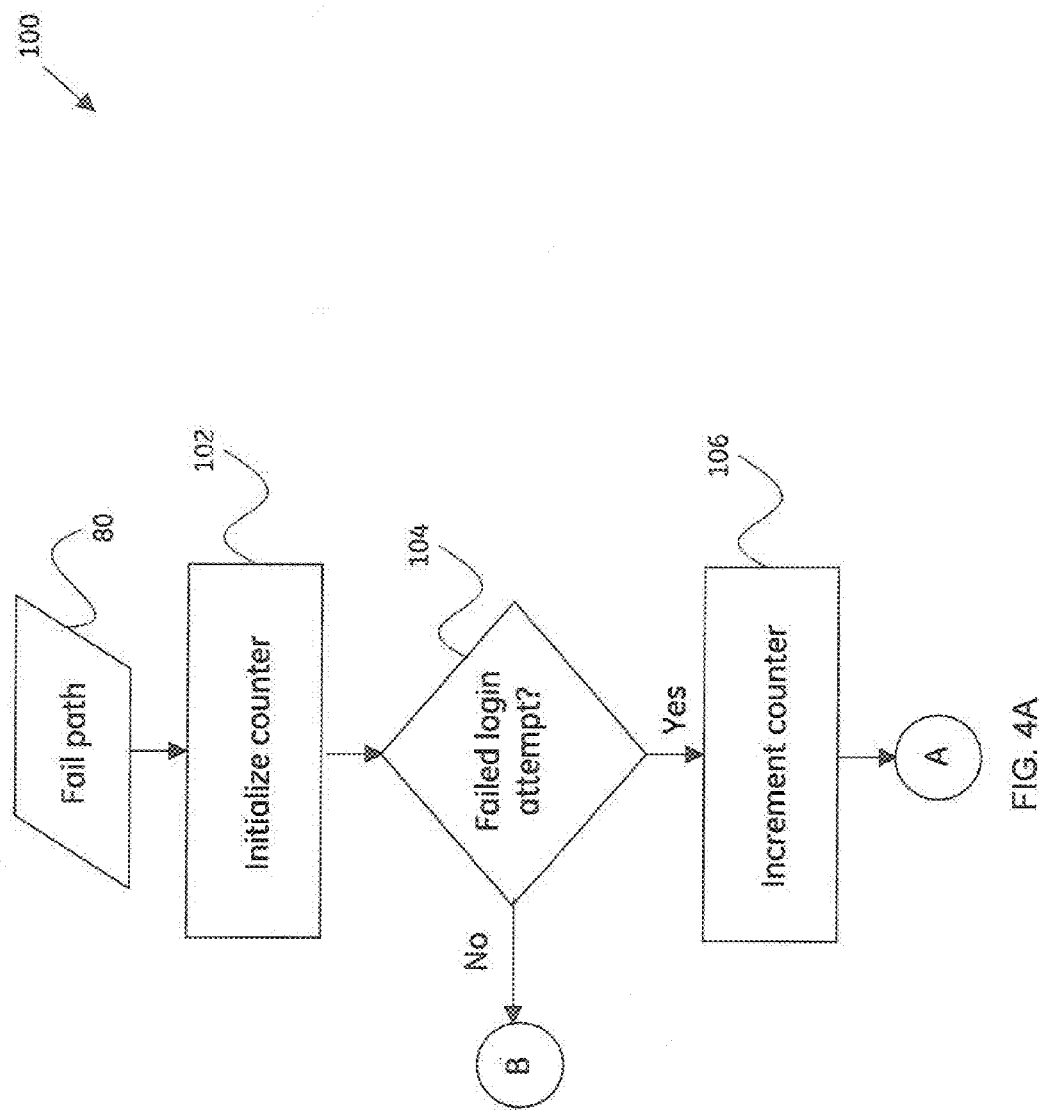
FIGS. 4A-4B are flow charts illustrating an exemplary process of protecting data, in accordance with aspects of the present technique.
Figure 4B:
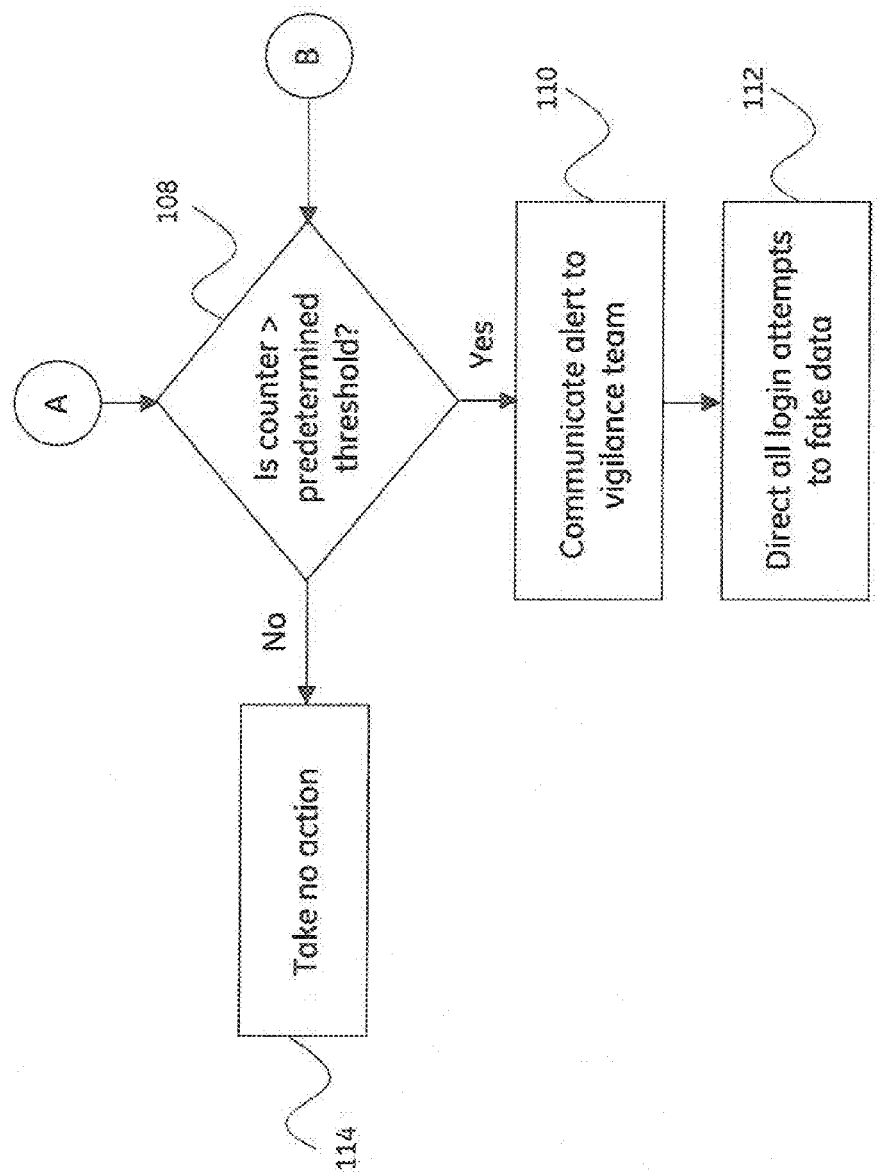

Referring now to FIGS. 4A-4B, a flow chart 100 illustrating a method of monitoring the number of failed attempts is depicted. The method starts at step 102, where a counter configured to track the failed login attempts may be initialized. In one embodiment, the counter may include the failed login attempts counter 30 (see FIG. 1). Subsequently, at step 104, a check may be carried out to verify if a failed login attempt has occurred. At step 104, if it is verified that there is a failed login attempt, the counter may be incremented, as indicated by step 106.

Furthermore, at step 108, another check may be carried out to verify if the value of the counter is greater than a predetermined threshold value. At step 108, if it is verified that the value of the counter is indeed greater than the predetermined threshold value, then an alert may be communicated to the vigilance team, as depicted by step 110. The alert may be indicative of a breach in security based on the number of failed login attempts. Moreover, the data security platform 26 (see FIG. 1) may be configured to automatically direct all subsequent login attempts by that user to a fail path, such as the fail path 80 of FIG. 3, as indicated by step 112.

With returning reference to the decision block 108, if the value of the counter is less than that of the predetermined threshold value, then the data security platform 26 may be configured to not take any further action, as depicted by step 114. Furthermore, with returning reference to the decision block 104, if no failed login attempt is detected, then control may be passed on to step 108.

Figure 5:
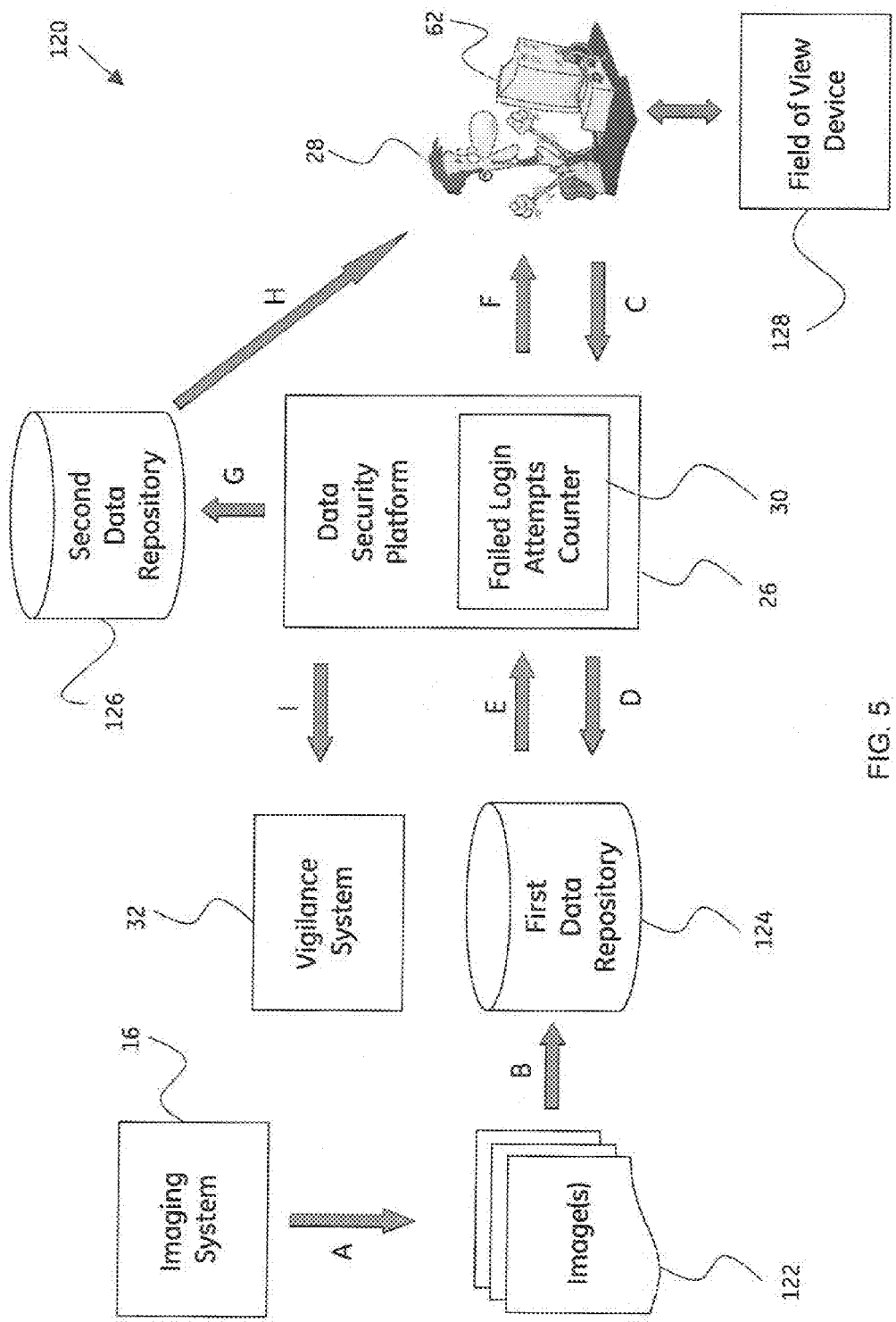
FIG. 5 is a diagrammatic illustration of the method of protecting data, in accordance with aspects of the present technique.

The method of providing data security depicted in FIGS. 3-4 may be better understood with reference to FIG. 5. Turning now to FIG. 5, a diagrammatic illustration 120 of steps of FIGS. 3-4 is depicted. More particularly, one example of a solution workflow for providing enhanced data security is depicted in FIG. 5. It may be noted that although the present example is described with reference to a medical imaging system 16 and patient related data, the present technique may also find application with other data such as, but not limited to, confidential financial data, human resources related data, and the like.

As previously noted, the imaging system 16 (see FIG. 1) may be employed to acquire patient related data, as indicated by step "A". In the present example, the patient related data is shown as including images 122 representative of a patient, such as the patient 12 (see FIG. 1). Further, these images may be stored in a first data repository 124, as depicted by step "B". In one embodiment, the first data repository 124 may include the storage subsystem 24 of FIG. 1. The images 122 so stored in the first data repository 124 may be indicative of "true" data.

Also, a user, such as the user 28 (see FIG. 1), may attempt to log in to the data storage system 20 (see FIG. 1) to access the image data 122 from the storage subsystem 24. In the present example, the user may attempt to login through a login node, such as the login node 62 (see FIG. 3). More particularly, the user may attempt to access the true data set 76 (see FIG. 3) stored in the first data repository 124, as indicted by step "C". In accordance with aspects of the present technique, the data security platform 26 (see FIG. 1) may be configured to verify the authenticity of the user 28 at a plurality of levels. Accordingly, the data security platform 26 may be configured to request the user 28 to verify his/her identity at a plurality of levels. As previously noted, the data security platform 26 may be configured to use biometric means, questions, user identification and password, or combinations thereof, to verify the authenticity of the user 28 as described in detail with reference to FIG. 3.

If the user 28 provides valid inputs at each of the plurality of levels of security, then, the user 28 may be permitted to access the true data from the first data repository 124. In other words, if the user 28 is verified as an authorized or authentic user, then the data security platform 26 may be configured to obtain the true data from the first data repository 124 as indicated by steps "D" and "E". This true data may then be communicated back to the authorized user, as indicated by step "F". The true data so retrieved from the first data repository 124 may be displayed on a display, such as the display 48 (see FIG. 2).

However, if at any of the multiple levels of security, the user 28 fails to provide valid input, the user 28 may be classified as an unauthorized user. Accordingly, the data security platform 26 may be configured to direct the unauthorized user to the fail path 80 (see FIG. 3). In other words, the data security platform 26 may be configured to direct the unauthorized user to fake or false data, where the fake data may be stored in a second data repository 126. Accordingly, the data security platform 26 may be configured to direct the unauthorized user to the second data repository 126, as indicated by step "G". It may be noted that although in the present example, the second data repository 126 is shown as including fake data, in certain other embodiments, the fake data may be stored in a portion of the first data repository 124, as previously noted. The data security platform 26 may then be configured to present the fake data to the unauthorized user, as depicted by step "H".

Moreover, the data security platform 26 may include the failed login attempts counter 30 (see FIG. 1), where the failed login attempts counter 30 may be configured to track the number of failed log in attempts by a user, such as the unauthorized user. In accordance with aspects of the present technique, if the value of the failed login attempts counter 30 exceeds the value of a predetermined threshold, then the data security platform 26 may be configured to notify the vigilance system 32 (see FIG. 1), which in turn may be configured to alert the vigilance personnel to take appropriate action. In one embodiment, the vigilance team may be configured to always direct the unauthorized user to fake data via the fail path 80 (see FIG. 3).

The vigilance subsystem 32 (see FIG. 1) may be configured to continuously monitor the login process at every step and the access to the stored data, irrespective of whether the user traverses the fail path 80 (see FIG. 3) or the pass path (see FIG. 3). Also, as previously noted, the apparent difficulty level to reach the stored confidential data remains equally hard whether user is on the fail path 80 or the pass path 78. Although the fail path 80 is configured to always lead the unauthorized user to the fake data set 86, the fail path 80 is configured to maintain a feel that is substantially similar to the pass path 78 in terms of response time and question difficulty to maintain the ambiguity of the process. The type of information requested at the various levels may also be varied each time of the process taking into consideration the path traversed through the various levels, thereby ensuring for additional ambiguity in the process. More particularly, in one embodiment, the system 120 may be configured to include a field of view device 128 configured to detect presence of a single user at a login node during a login process. This field of view device 128 may also be configured to lock out a user from the system 120 when an intrusion in the form of multiple users at the particular login node is detected. It may be noted that the field of view device 128 may include a camera, a sonar, or a combination thereof, for example.

In accordance with further aspects of the present technique, an additional measure of security may be provided. In one embodiment, the additional measure of security may include a field of view device that may be added to the system 10 to ensure there is just one user in the vicinity of a login node, such as the login node 62 (see FIG. 3) while a user logs into the system 10. This additional security however may be dependent upon severity of data security desirable. The vigilance team, when alerted may take an action such as to direct all login attempts from a particular login node to fake data via a fail path irrespective of the user entering valid keys. This kind of action may be configured to prevent a hacker from attempting to login multiple times in search of the unique key. In addition, the vigilance subsystem 32 may be configured to generate vigilance alerts in response to irregular patterns. Although the vigilance subsystem 32 is configured to monitor all activities of a user, the vigilance subsystem 32 may also be configured to customize alerts at each security level corresponding to success or failure occurring at a particular security level and a corresponding login pattern. On being alerted at a particular login node, the vigilance subsystem 32 or the vigilance team may be configured to block that login node or always direct a user down the fail path.

In accordance with further aspects of the present technique, offline protection for the confidential data stored in a data repository, such as the storage subsystem 24 (see FIG. 1) may be provided. By way of example, sequence of the stored data may be jumbled depending on keys input by the user attempting to access the stored data. Furthermore, the system 120 may also be configured to further verify the authenticity of a user accessing the true data set 76 (see FIG. 3). Accordingly, an encrypted system identification file may be included in a system used by a user. The system may include the login node 62 (see FIG. 3), for example. It may be noted that any user of the login node is unaware of the system identification file. After the user successfully passes through all the multiple levels of security, before progressing to accessing the true data set 76 (see FIG. 3), a custom application may be downloaded to the login node 62. The application may also be configured to modify information and format of the system identification file and re-encrypt the system identification file with a new encryption algorithm or key. Then the user may be directed to the true data set if the authenticity of the login node may be verified, while in the case of a non-authentic login node, the user is always directed to a fake data set. The system identification files may include information regarding a valid login node being used by an unauthorized user, thus indicating that the login node may be used by a hacker instead of an authorized user.

Moreover, in accordance with further aspects of the present technique, an authorized user may also be trained to provide a definite "false answer" in response to the plurality of security levels, where the false answer may be configured to automatically alert the vigilance team of a probable breach in security. Also, the system 10 may be configured to always direct login account of that user to the fail path, until vigilance resets this behavior. Additionally, group security may also be provided by arranging the security questions in such an order that the system 10 may be configured to identify a user as well as a group login account corresponding to a particular data set.

It may be noted that in accordance with aspects of the present technique, a path traversed by each user from the login node to the data set may be monitored. By way of example, the path traversed by an authorized user along the pass path 78 from the login node 62 to the true data set 76 may be monitored. Similarly, the path traversed by an unauthorized user along the fail path 80 from the login node 62 to the fake data set 86 may also be monitored. Monitoring the login paths followed by an user may then be used to track any suspicious behavior, thereby allowing the vigilance system 32 (see FIG. 1) and/or the vigilance team to closely track the activities of an unauthorized user, for example, and hence providing additional security to the data stored in the data repository, such as the first data repository 124.

As will be appreciated by those of ordinary skill in the art, the foregoing example, demonstrations, and process steps may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code, as will be appreciated by those of ordinary skill in the art, may be stored or adapted for storage on one or more tangible, machine readable media, such as on memory chips, local or remote hard disks, optical disks (that is, CD's or DVD's), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

The method for protecting data stored in a data repository and the system for protecting data stored in a data repository described hereinabove dramatically simplify procedural workflow. Moreover, the system may be configured to provide enhanced protection to sensitive and confidential information from hackers introducing a sense of ambiguity, as the user is unaware of the authenticity of the information obtained from the data repository. More particularly, the sense of ambiguity may be introduced by leading an unauthorized user to a fake data set instead of notifying the unauthorized user of a failed login attempt. Further, providing multiple keys at multiples allows easy identification of the user and/or user group. Accordingly, the vigilance team may detect a breach in security sooner and have more time to take necessary preventive and/or corrective action. Moreover, the present technique may easily be implemented using existing technology. Also, the number of security levels may be varied based on the security requirements of the stored data.

The above-description of the embodiments of the method for protecting data stored a data repository and the system for protecting data stored in a data repository have the technical effect of enhancing workflow by providing multiple levels of security to sensitive and confidential data, thereby advantageously resulting in securing confidential information stored by several institutions and preventing unauthorized access to the sensitive and confidential data.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for protecting data stored in a computer memory comprising a data repository, the method comprising:
   verifying, by a computer, authenticity of a user at a first security level;
   continuing on a first path in response to correct user identification at the first security level;
   verifying authenticity of the user at a second security level of the first path;
   continuing on the first path in response to correct user identification at the second security level;
   verifying authenticity of the user at a third security level of the first path;
   allowing user access to a first data set stored in a computer memory in response to a correct user identification at the third security level of the first path the first data set comprising true data;
   directing the user to a second path in response to incorrect user identification at one of the first, the second and the third security levels of the first path;
   identifying an unauthorized access attempt in response to an incorrect user identification at one of the first, the second and the third security levels of the first path;
   querying a user as to user identification information at each of a second security level and a third security level of the second path; and
   presenting a second data set to the user in response to user submission of a response at each of the second and the third security levels of the second path, the second data set being fake data;
   wherein the second path directs the user to the fake data and the first path directs the user to the true data so as to not alert an unauthorized user of an unauthorized access attempt; and
   wherein the verifying of the authenticity of the user at each of the first, the second and the third security levels of the first path comprises employing different authentication at each of the security levels.

2. The method of claim 1, wherein the different authentication comprises a user identification, a password, a biometric authentication, a date of birth, a city of residence, a country of residence, or combination thereof.

3. The method of claim 1, further comprising:
   acquiring one or more objects via use of an acquisition system; and
   communicating the one or more objects from the acquisition system to a first data repository.

4. The method of claim 3, wherein the one or more objects comprises images, image data, financial information, clinical research findings, genetic information, maintenance records, service records, log files, or combinations thereof.

5. The method of claim 3, further comprising:
   storing the one or more objects in the first data repository, wherein the one or more objects stored in the first data repository comprises the first data set.

6. The method of claim 5, further comprising:
   generating another set of one or more objects, wherein the another set of one or more objects comprises the second data set; and
   storing the second data set in a second data repository.

7. The method of claim 1, further comprising:
   logging into a system via a login node to access the first data set.

8. The method of claim 1, wherein verifying the authenticity of the user at each of the security levels comprises:
   presenting a security check to the user;
   prompting the user to provide at least one input in response to the security check; and
   verifying the validity of the input provided by the user.

9. The method of claim 1, further comprising:
   not notifying the user of any failed login attempts.

10. The method of claim 1, further comprising:
    monitoring a number of failed login attempts.

11. The method of claim 10, further comprising:
    comparing the number of failed login attempts with a predetermined threshold value.

12. The method of claim 11, further comprising:
    directing the user to the second data set if the number of failed login attempts is greater than the predetermined threshold value.

13. The method of claim 12, further comprising:
generating a vigilance alert in response to the number of failed login attempts exceeding the predetermined threshold value; and
notifying vigilance personnel via the vigilance alert.

14. The method of claim 1, further comprising:
presenting user-viewable representations of one of the first data set or the second data set to the user.

15. A system for protecting access to data stored in a computer memory comprising a data repository, the system comprising:
a data storage subsystem for storing one or more objects in the data repository; and
a data security platform for restricting access to the stored one or more objects, the data security platform being configured to:
verify authenticity of a user at each of a plurality of security levels;
direct the user to one of a first path or a second path based on the verification of the authenticity of the user at each of the plurality of security levels;
allow access to a first set of data stored in the data repository upon verifying authenticity of the user at each of the plurality of security levels of the first path, the first set of data being true data; and
present a second set of data upon receipt of responses to each of the plurality of security levels of the second path, the second set of data being fake data;
wherein the user is directed to the second path in response to an incorrect user identification at one of the plurality of security levels of the first path;
wherein the second path directs the user to the fake data and the first path directs the user to the true data so as to not alert an unauthorized user of an unauthorized access attempt; and
wherein verifying the authenticity of the user at each of the plurality of security levels of the first path comprises employing a different authentication at each of the plurality of security levels.

16. The system of claim 15, further comprising:
a vigilance subsystem configured to monitor activities of the user, the system, or both.

17. The system of claim 16, further comprising:
a field of view device configured to monitor activities of the user.

* * * * *

UNITED STATES PATENT AND TRADEMARK OFFICE
CERTIFICATE OF CORRECTION

| | | |
|---|---|---|
| PATENT NO. | : 8,424,098 B2 | Page 1 of 1 |
| APPLICATION NO. | : 12/624597 | |
| DATED | : April 16, 2013 | |
| INVENTOR(S) | : Bhatia et al. | |

It is certified that error appears in the above-identified patent and that said Letters Patent is hereby corrected as shown below:

In the Specification:

In Column 4, Line 34, delete "system" and insert -- system 20 --, therefor.

In Column 9, Line 33, delete "86." and insert -- 76. --, therefor.

In the Claims:

In Column 13, Line 57, in Claim 1, delete "comprising" and insert -- comprising: --, therefor.

In Column 13, Line 60, in Claim 1, delete "to correct" and insert -- to a correct --, therefor.

In Column 13, Line 64, in Claim 1, delete "to correct" and insert -- to a correct --, therefor.

In Column 14, Line 3, in Claim 1, delete "path the" and insert -- path, the --, therefor.

In Column 14, Line 5, in Claim 1, delete "to incorrect" and insert -- to an incorrect --, therefor.

In Column 14, Line 24, in Claim 1, delete "employing different" and insert -- employing a different --, therefor.

In Column 16, Line 13, in Claim 15, delete "verifying the authenticity" and insert -- verifying authenticity --, therefor.

Signed and Sealed this
Sixth Day of August, 2013

Teresa Stanek Rea
*Acting Director of the United States Patent and Trademark Office*